US012755086B2

(12) United States Patent
Liu et al.

(10) Patent No.: US 12,755,086 B2
(45) Date of Patent: Oct. 6, 2026

(54) CHARACTER GENERATION METHOD AND APPARATUS, ELECTRONIC DEVICE, AND STORAGE MEDIUM

(71) Applicant: Beijing Zitiao Network Technology Co., Ltd., Beijing (CN)

(72) Inventors: Wei Liu, Beijing (CN); Fangyue Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 167 days.

(21) Appl. No.: 18/725,688

(22) PCT Filed: Dec. 26, 2022

(86) PCT No.: PCT/CN2022/141827
§ 371 (c)(1),
(2) Date: Jun. 28, 2024

(87) PCT Pub. No.: WO2023/125379
PCT Pub. Date: Jul. 6, 2023

(65) Prior Publication Data

US 2025/0077761 A1 Mar. 6, 2025

(30) Foreign Application Priority Data

Dec. 29, 2021 (CN) ........................ 202111644361.6

(51) Int. Cl.
*G06F 40/109* (2020.01)

(52) U.S. Cl.
CPC .................................. *G06F 40/109* (2020.01)

(58) Field of Classification Search
CPC ......... G06F 40/109; G06F 16/35; G06N 3/04; G06N 3/08
See application file for complete search history.

(56) References Cited

U.S. PATENT DOCUMENTS

2014/0095586 A1* 4/2014 Grosz ..................... H04L 67/51 709/203
2020/0320325 A1 10/2020 Okuma
(Continued)

FOREIGN PATENT DOCUMENTS

CN 109285111 A 1/2019
CN 112115678 A 12/2020
(Continued)

OTHER PUBLICATIONS

International Patent Application No. PCT/CN2022/141827; Int'l Written Opinion and Search Report; dated Mar. 20, 2023; 7 pages.
(Continued)

*Primary Examiner* — Daniel F Hajnik
*Assistant Examiner* — Adeel Bash
(74) *Attorney, Agent, or Firm* — BakerHostetler

(57) ABSTRACT

Embodiments of the present invention provide a character generation method and apparatus. an electronic device, and a storage medium. The method comprises: obtaining a character to be displayed and a pre-selected target style type: converting the character to be displayed into a target character corresponding to the target style type, wherein the target character is generated in at least one of the following modes: generating the target character in advance on the basis of a style type conversion model, and generating the target character in real time on the basis of the style type conversion model; and displaying the target character on a target display interface.

20 Claims, 4 Drawing Sheets

(56) References Cited

U.S. PATENT DOCUMENTS

| | | | | |
|---|---|---|---|---|
| 2021/0089707 | A1* | 3/2021 | Katz | H04L 51/046 |
| 2021/0201548 | A1* | 7/2021 | Ozeki | G06V 10/82 |

FOREIGN PATENT DOCUMENTS

| | | | |
|---|---|---|---|
| CN | 112419174 | A | 2/2021 |
| CN | 113569080 | A | 10/2021 |
| CN | 113807430 | A | 12/2021 |
| CN | 114330236 | A | 4/2022 |
| JP | 2012-173833 | A | 9/2012 |

OTHER PUBLICATIONS

Bae et al.; "Font Style Migration Method Based on Generative Adversarial Network"; Journal of Dalian Minzu University; vol. 21(3); 2019; p. 250-256 (contains English Abstract only).

* cited by examiner

CHARACTER GENERATION METHOD AND APPARATUS, ELECTRONIC DEVICE, AND STORAGE MEDIUM

CROSS-REFERENCE TO RELATED APPLICATION(S)

The disclosure is a national stage application filed under 35 U.S.C. 371 based on International Patent Application No. PCT/CN2022/141827, filed on Dec. 26, 2022, which claims the priority to the Chinese Patent Application No. 202111644361.6, filed on Dec. 29, 2021, which are incorporated herein by reference in their entireties.

FIELD

Examples of the disclosure relate to the technical field of artificial intelligence, and relate to, for instance, method and apparatus, electronic device, and storage medium for generating character.

BACKGROUND

At present, time cost, material cost and human cost of designing a set of uniquely styled Chinese characters are generally huge for developers.

Since a difference between Chinese characters in different styles is dramatic, it is difficult to obtain a font in an expected style even after a Chinese character is manually designed and repeatedly modified by a professional designer.

SUMMARY

Examples of the disclosure provide a method and apparatus for generating a character, an electronic device, and a storage medium, which not only provide a concise and efficient character design solution, but also avoid low efficiency, high cost and inability to accurately obtain an expected font in a manual design process in the related art.

In a first aspect, an example of the disclosure provides a method for generating character. The method includes:

- obtaining a character to be displayed and a pre-selected target style type;
- converting the character to be displayed into a target character corresponding to the target style type, where the target character is generated in at least one of the following modes: generating the target character in advance on the basis of a style type conversion model and generating the target character in real time on the basis of the style type conversion model; and
- displaying the target character on a target display interface.

In a second aspect, an example of the disclosure further provides an apparatus for generating a character. The apparatus includes:

- a style type determination module configured to obtain a character to be displayed and a pre-selected target style type;
- a target character determination module configured to convert the character to be displayed into a target character corresponding to the target style type, where the target character is generated in at least one of the following modes: generating the target character in advance on the basis of a style type conversion model and generating the target character in real time on the basis of the style type conversion model; and
- a character display module configured to display the target character on a target display interface.

In a third aspect, an example of the disclosure further provides an electronic device. The electronic device includes:

- one or more processors; and
- a storage apparatus configured to store one or more programs.

When the one or more programs are executed by the one or more processors, the one or more processors are caused to implement the method for generating a character according to any one of the examples of the disclosure.

In a fourth aspect, an example of the disclosure further provides a storage medium including a computer-executable instruction. The computer-executable instruction is configured to execute the method for generating a character according to any one of the examples of the disclosure when being executed by a processor of a computer.

BRIEF DESCRIPTION OF THE DRAWINGS

In the drawings, the same or similar reference numerals denote the same or similar elements. It should be understood that the drawings are illustrative, and components and elements are not necessarily drawn to scale.

DETAILED DESCRIPTION OF EMBODIMENTS

It should be understood that a plurality of steps described in method embodiments of the disclosure may be executed in a different order and/or in parallel. Further, the method embodiments may include additional steps and/or omit execution of the illustrated steps, which do not limit the scope of the disclosure.

The terms “include” and “comprise” used herein and their variations are open-ended, that is, “include but not limited to” and “comprise but not limited to”. The term “on the basis of” means “at least partly on the basis of”. The term “an example” means “at least one example”. The term “another example” means “at least another example”. The term “some examples” means “at least some examples”. Related definitions of other terms will be given in the following description.

It should be noted that concepts such as “first” and “second” mentioned in the disclosure are only used to distinguish different apparatuses, modules or units, and are not used to limit an order or interdependence of functions executed by the apparatuses, modules or units.

It should be noted that modification with “a”, “an” or “a plurality of” mentioned in the disclosure is illustrative rather than limitative, and should be understood by those skilled in the art as “one or more” unless explicitly stated otherwise in the context.

Figure 1:
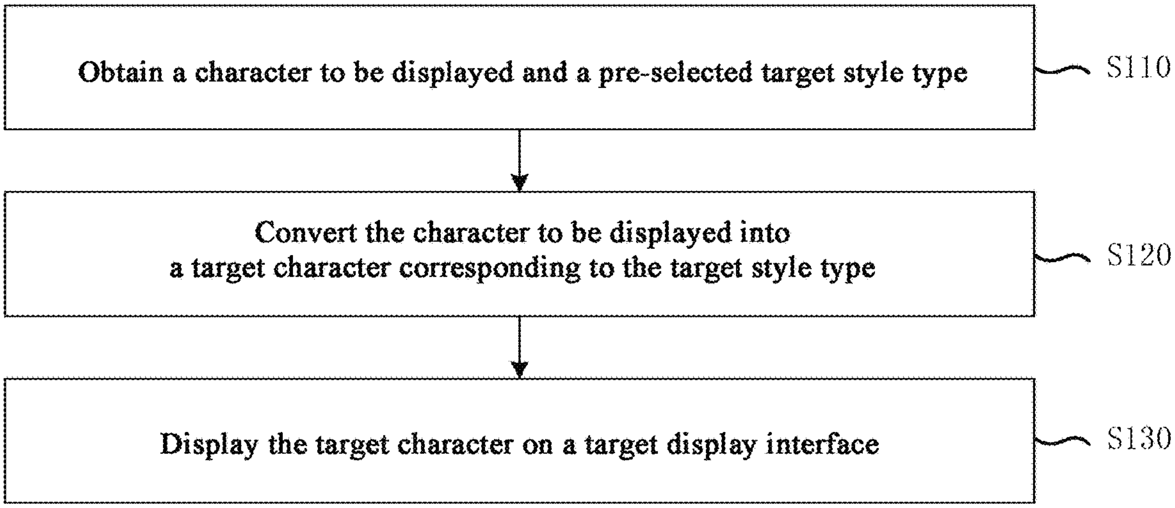
FIG. 1 is a schematic flow diagram of a method for generating a character according to an example of the disclosure.

FIG. 1 is a schematic flow diagram of a method for generating a character according to an example of the disclosure. The example is suitable for a case of designing a character in the related art to obtain an expected font. The method may be executed by an apparatus for generating a character. The apparatus may be implemented in a form of software and/or hardware. The hardware may be an electronic device, such as a mobile terminal, a personal computer (PC) terminal, or a server.

Before the technical solution is introduced, firstly an application scene may be illustratively described. The technical solution may be applied to any scene in which a character having a specific style type needs to be generated. For instance, when a user finds that a style type corresponding to a certain character or a plurality of characters meets expectations, the user may present any Chinese character in the above style type on the basis of the solution of the example; or on the basis of the solution of the example, a computer character library having a writing style type of a certain user may be quickly generated after part of handwriting of the user is obtained.

As shown in FIG. 1, the method of the example includes the following steps:

S110, a character to be displayed and a pre-selected target style type are obtained.

The character to be displayed may be one or more characters written by a user, or a character that may be displayed on a display device. For instance, the character may be written by the user by a handwriting board or related applications in a computer. Accordingly, after the user writes one or more characters, the computer may obtain the characters and determine the characters as the character to be displayed s. It may be understood that in an actual application process, an image including a character written by the user may also be recognized, and then the recognized character may be used as the character to be displayed. For instance, after the user writes a character “永” on a handwriting board, the user may photograph the character and upload an image of the character to a system. After the system recognizes the image, the character “永” written by the user may be obtained and used as the character to be displayed.

In the example, the character to be displayed may also be a character that is already designed in the computer and assigned with a specific instruction order, and for instance, a character in a simplified Chinese character library or a traditional Chinese character library that exists in the computer. It may be understood that the system may at least describe a font of the character on the basis of the specific instruction order and display the character on an associated display device. For instance, when the user inputs “yong” through a Pinyin input method on the computer and selects a Chinese character (for instance, a character “永”) having a corresponding pronunciation from a result list, the computer may obtain an internal code of the character (for instance, an internal code of the character “永”) from the existing simplified Chinese character library, and determine a character having a font corresponding to the internal code as the character to be displayed.

In the example, after the character to be displayed is obtained, the pre-selected target style type needs to be determined. The target style type is a character style type expected by the user. For instance, a style type of Chinese characters may be a song typeface, a regular script, a bold type, etc., which obtain corresponding copyrights. Certainly, in an actual application process, if the character style type expected by the user is a font similar to a writing style of the user, the target style type may be a style type similar to the writing style of the user.

It may be understood that characters having different style types are different in stroke style and form and structure of a Chinese character. For instance, strokes of the same Chinese character of different style types have different thicknesses and squared or round corners, and meanwhile, collocation, arrangement and combination of the strokes are also different. Differences of handwriting of different users in character writing styles may be enlarged.

In the example, the user may select the target style type on the basis of a style type selection control pre-developed in the system. For instance, a drop-down list of a corresponding style type selection control of Chinese characters may include a song typeface and a regular script that obtain copyrights, user A handwriting, user B handwriting, etc.

S120, the character to be displayed is converted into a target character corresponding to the target style type.

In the example, after the system obtains the character to be displayed and determines the corresponding target style type, the character to be displayed may be converted, such that the target character having the target style type is obtained. The process may be understood as converting a character in a stroke style and a form and a structure of a Chinese character into a character in another stroke style and another form and structure of a Chinese character.

For instance, the target character may be converted into the target character on the basis of a style type conversion model. The style type conversion model may be a pre-trained convolutional neural network model. Input of the model is the character to be displayed and the target style type. Accordingly, output of the model is the target character. For instance, in response to determining that a character having a copyrighted song typeface and input by the user on the basis of an input method is the character to be displayed and that the pre-selected target style type is the “user A handwriting”, a character “永” having the copyrighted song typeface and information associated with the target style type may be input into the style type conversion model, and the character “永” similar to the user A handwriting may be obtained after model processing and determined as the target character. It may be understood that when the character style type expected by the user is a font similar to the writing style of the user, the above character processing process on the basis of the style type conversion model is essentially a process of imitating writing habits (handwriting) of the user to generate the target character corresponding to the character to be displayed.

In an actual application process, the target character is generated in advance on the basis of a style type conversion model and/or generated in real time on the basis of the style type conversion model. That is, the system may process the character to be displayed in real time with the style type conversion model to generate the corresponding target character; or pre-process a plurality of characters existing in a character library with the style type conversion model to obtain corresponding characters having various style types.

For instance, a mapping table representing an association relation is created on the basis of characters in the character library in the related art and corresponding characters having various style types. When the character to be displayed is determined from the character library in the related art and the target style type is determined, the corresponding target character may be directly determined and called by looking up the table, and therefore character generation efficiency is optimized.

S130, the target character is displayed on a target display interface.

In the example, after the target character is determined on the basis of the style type conversion model, the system may at least describe and present the target character on the basis of a model output result. It may be understood that the system may at least determine image information corresponding to the target character on the basis of the output of the style type conversion model and display the image information on the target display interface. The target display interface may be a visual interface associated with the system, which may at least call and display the image information corresponding to the target character.

It should be noted that in an actual application process, after the target character is determined, the target character may be exported in a form of a related image file, or a related image file may be transmitted to a corresponding client of the user. In a case that a plurality of target characters converted are obtained, a specific character library may be created for the characters. That is, a set of image source is generated on the basis of the image information of the target characters, and the image source may be associated with internal codes corresponding to the characters, so as to be used as characters having the target style type and used directly by the user in a subsequent process. It may be understood that the processing method provides a concise and efficient way for the user to quickly generate a character library similar to handwriting of the user.

According to the technical solution of the example, the character to be displayed and the pre-selected target style type are obtained; then the character to be displayed is converted into the target character having the target style type, where the target character is generated in advance on the basis of a style type conversion model and/or generated in real time on the basis of the style type conversion model; and finally, the target character is displayed on the target display interface. An artificial intelligence model is introduced to generate a font in a specific style, which not only provides a concise and efficient character design solution, but also avoids low efficiency, high cost and inability to accurately obtain an expected font in a manual design process in the related art.

Figure 2:
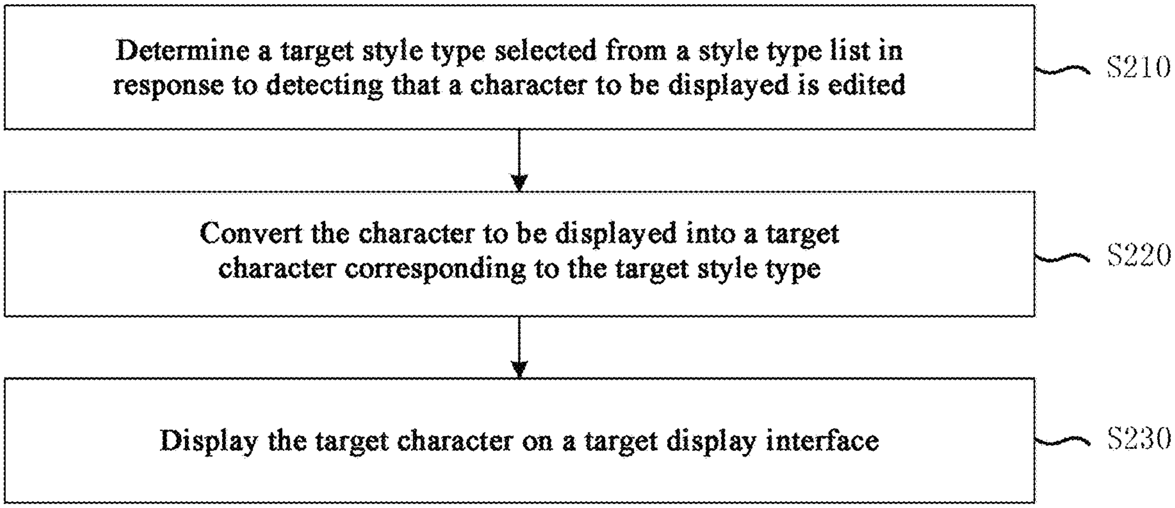
FIG. 2 is a schematic flow diagram of a method for generating a character according to another example of the disclosure.

FIG. 2 is a schematic flow diagram of a method for generating a character according to another example of the disclosure. On the basis of the above example, a style type conversion model is created on the basis of a font feature extraction sub-model, a decoupling model, a feature splicing sub-model, and a feature processing sub-model. Various artificial intelligence algorithms are introduced to determine character features, which provides an efficient and intelligent method for generating a character library for the user. A target character corresponding to a character to be displayed is directly determined from a target character package, and therefore character generation efficiency is improved. Reference may be made to the technical solution of the example for the illustrative embodiment. Technical terms the same as or corresponding to the above example are not repeated herein.

As shown in FIG. 2, the method includes the following steps:

S210, a target style type selected from a style type list is determined in response to detecting that a character to be displayed is edited.

In the example, the system may detect input of a user in a text box. In response to detecting that the user edits a character in the text box, a corresponding character may be obtained as the character to be displayed in a character library in the related art. Meanwhile, according to a touch operation of the user for a style type selection control, a corresponding style type list is displayed. It may be understood that the list includes at least one style type, such as user A handwriting and user B handwriting. Because the character to be displayed needs to be processed with a style type conversion model in a subsequent process, it may be understood that the style type list includes a style type corresponding to the style type conversion model. For instance, on the basis of a selection result of the user in the list, the target style type may be determined, that is, a font expected by the user may be determined.

S220, the character to be displayed is converted into a target character corresponding to the target style type.

In a process of converting the character to be displayed into the target character, for instance, the target character consistent with the character to be displayed is obtained from a target character package corresponding to the target style type.

For instance, after the target style type is determined, the system may determine the target character package according to an identifier of the style type. The target character package is generated after a plurality of characters are converted into a target font on the basis of the style type conversion model. It may be understood that the system pre-converts a plurality of characters in a character library in the related art into characters having corresponding style types on the basis of the style type conversion model, and obtains related data of the characters (for instance, character identifiers, image information, and corresponding internal codes), so as to create the target character package according to related data of the characters converted. Meanwhile, the target character package is associated with the corresponding style type in the style type list. For instance, the target character package corresponds to "user A handwriting" in the style type list.

For instance, when the target character package is determined, the target character consistent with the character to be displayed may be obtained from the target character package according to related data of the character to be displayed. That is, the target character having the same content as and a different style type (for instance, a stroke style or a form and a structure of a Chinese character) from the character to be displayed is obtained from the target character package.

When the character to be displayed and the target style type are determined, the corresponding target character may be retrieved from the target character package, and therefore character generation efficiency is improved.

In an actual application process, when the user selects the target style type from the style type list, the system may not pre-create the target character package for the font on the basis of the style type conversion model. In this case, the system may directly input the character to be displayed into the style type conversion model to obtain the target character corresponding to the target font. A process of generating the target character will be described in detail below in combination with an overall network structural diagram of the style type conversion model shown in FIG. 3.

Figure 3:
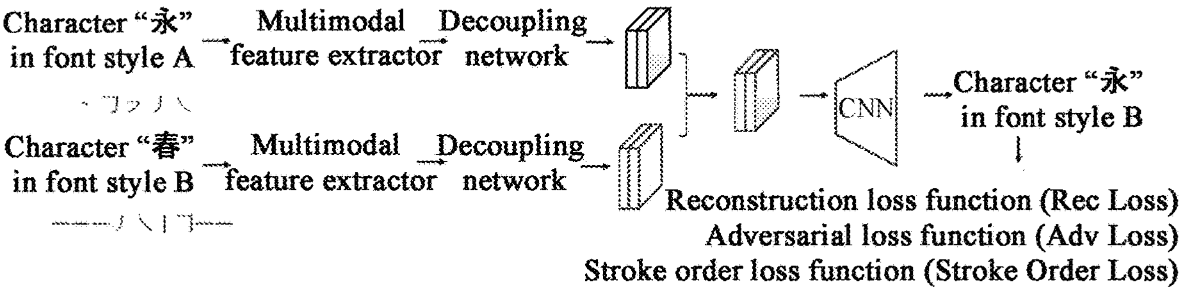
FIG. 3 is a structural diagram of an entire network of a style type conversion model according to an example of the disclosure.

With reference to FIG. 3, in the example, the style type conversion model includes a first font feature extraction sub-model, a second font feature extraction sub-model, a first decoupling model connected to the first font feature extraction sub-model, a second decoupling model connected to the second font feature extraction sub-model, a feature splicing sub-model connected to the first decoupling model and the second decoupling model, and a feature processing sub-model.

The first font feature extraction sub-model and the second font feature extraction sub-model have the same model structure, and are configured to determine character features of the plurality of characters. For instance, the character features include a style type feature and a character content feature. It may be understood that the character features include features that reflect stroke orders and forms and structures of a Chinese character of characters and fonts (that is, the style type features), and further include features that reflect corresponding meanings or identifier information of characters in a computer (that is, the character content features). Therefore, the first font feature extraction sub-model and the second font feature extraction sub-model may also be used as multimodal feature extractors of characters.

For instance, a first to-be-decoupled character feature of the character to be displayed is determined on the basis of the first font feature extraction sub-model, and a second to-be-decoupled character feature of a target style character is determined on the basis of the second font feature extraction sub-model. It may be understood that the first font feature extraction sub-model may be configured to determine the style type feature and the character content feature (that is, the first to-be-decoupled character feature) of the character to be displayed, and the second font feature extraction sub-model may be configured to determine a style type feature and a character content feature (that is, the second to-be-decoupled character feature) of any character having the same style type as the target character. In an actual application process, any character having the same style type as the target character may be used as the target style character. It may be understood that a character type of the target style character is consistent with the target style type.

With FIG. 3 as an instance, after the character to be displayed is input into the first font feature extraction sub-model for processing, the computer may determine that the character is a character "永" having a stroke order and a form and a structure of a Chinese character of a copyrighted song typeface. When the target style type is "user A handwriting", in order to obtain a character "永" corresponding to the font, a character "春" written by user A in the related art may be input into the second font feature extraction sub-model, and the computer may determine that the character is a character "春" having a stroke order and a form and a structure of a Chinese character of the user A handwriting.

In the example, the decoupling model is configured to decouple the character features extracted by the font feature extraction sub-model to distinguish the style type feature from the character content feature. For instance, the first to-be-decoupled character feature is processed on the basis of the first decoupling model, and a to-be-displayed style type feature and a to-be-displayed content feature of the character to be displayed are obtained; and the second to-be-decoupled character feature is processed on the basis of the second decoupling model, and the target style type and a target content feature of the target style character are obtained. It may be understood that after the character to be displayed is processed on the basis of the first decoupling model, the decoupled style type feature of the character to be displayed is used as the to-be-displayed style type feature, and the character content feature of the character to be displayed is used as the to-be-displayed content feature. Meanwhile, after the target style character is processed on the basis of the second decoupling model, the decoupled style type feature of the target style character is used as the target style type feature, and the character content feature of the target style character is used as the target content feature.

With reference to FIG. 3, when the first font feature extraction sub-model determines that the character to be displayed is a character "永" having a copyrighted song typeface, the style type feature and the character content feature of the character are decoupled with the corresponding first decoupling model, such that a feature of the character under a stroke order and a form and a structure of a Chinese character of the copyrighted song typeface and a feature corresponding to a meaning or identifier information of the character may be obtained. When the second font feature extraction sub-model determines that the character to be displayed is a character "春" written by user A, the style type feature and the character content feature of the character are decoupled with the corresponding second decoupling model, such that a feature of the character under a stroke order and a form and a structure of a Chinese character of user A handwriting and a feature corresponding to a meaning or identifier information of the character may be obtained.

In the example, the feature splicing sub-model is configured to splice the character features extracted by the decoupling modules to obtain a corresponding character style feature. For instance, the to-be-displayed content feature and the target style type are obtained on the basis of the feature splicing sub-model, and the character style feature corresponding to the character to be displayed is obtained. It may be understood that the character content feature of the character to be displayed and the style type feature of the target style character are spliced to obtain the character style feature corresponding to the character to be displayed.

With reference to FIG. 3, after the first decoupling model and the second decoupling model decouple multimodal features of the characters "永" and "春" respectively, the feature splicing sub-model may select a character content feature of the character "永" and a style type feature of the character "春" from the decoupled features. For instance, the above two features are spliced, such that a feature configured to generate the character "永" in a style type of the user A handwriting may be obtained.

In the example, the feature processing sub-model is configured to process the character style feature to obtain the target character of the character to be displayed in the target style type, which may be a convolutional neural networks (CNN) model. For instance, the character style feature is processed on the basis of the feature processing sub-model, and the target character corresponding to the character to be displayed in the target style type is obtained.

With reference to FIG. 3, after the feature splicing sub-model outputs a feature vector configured to generate the character "永" in the style type of the user A handwriting, the feature vector is processed with the CNN model, such that image information of the character "永" that may be called and displayed by the computer may be output.

S230, the target character is displayed on a target display interface.

According to the technical solution of the example, a style type conversion model is created on the basis of the font feature extraction sub-model, the decoupling model, the feature splicing sub-model, and the feature processing sub-model. Various artificial intelligence algorithms are introduced to determine the character features, which provides an efficient and intelligent method for generating a character library for the user. The target character corresponding to the character to be displayed is directly determined from the target character package, and therefore character generation efficiency is improved.

Figure 4:
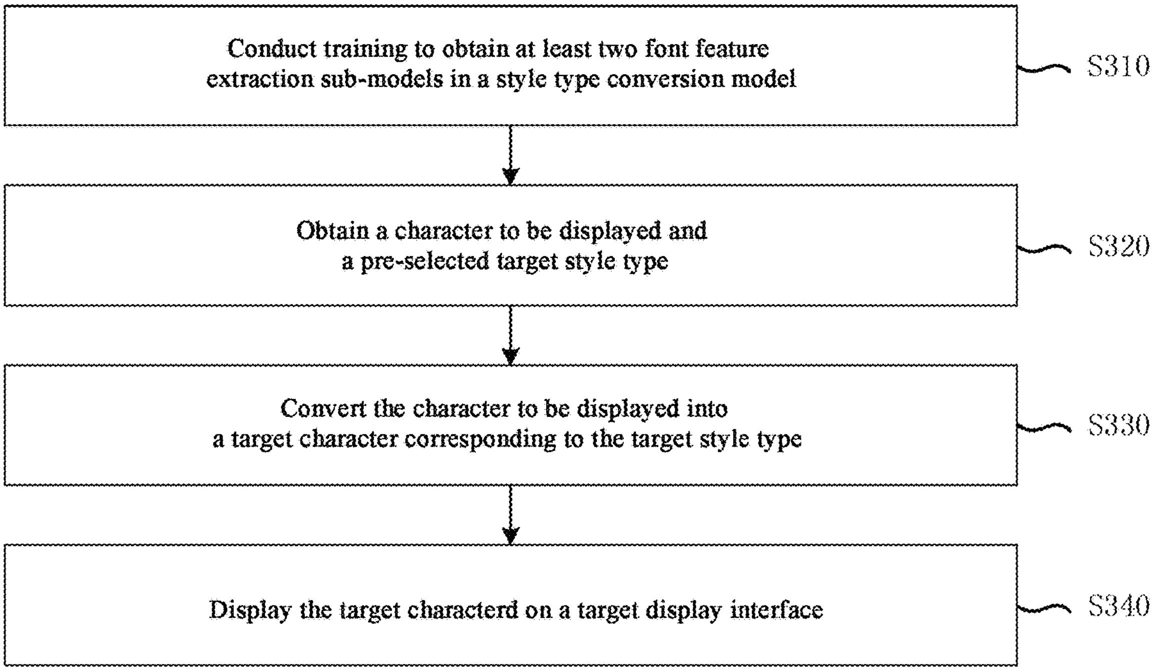
FIG. 4 is a schematic flow diagram of a method for generating a character according to yet another example of the disclosure.

FIG. 4 is a schematic flow diagram of a method for generating a character according to yet another example of the disclosure. On the basis of the above example, at least two to-be-trained font feature extraction sub-models in a style type conversion model are trained on the basis of a first training sample. For instance, parameters of the sub-models are optimized on the basis of a first preset loss function and a second preset loss function respectively, and finally a decoding module is eliminated, such that a multimodal feature extractor in the style type conversion model may be obtained. Reference may be made to the technical solution of the example for the illustrative embodiment. Technical terms the same as or corresponding to the above example are not repeated herein.

As shown in FIG. 4, the method includes the following steps:

S310, training is conducted to obtain at least two font feature extraction sub-models in the style type conversion model.

It should be noted that the at least two font feature extraction sub-models in the style type conversion model need to be trained before a target character is generated on the basis of the model. It may be understood that at least one font feature extraction sub-model is trained to extract style type features (such as a stroke order and a form and a structure of a Chinese character) of a character, and meanwhile, at least one font feature extraction sub-model is trained to extract character content features (such as a character meaning and a character identifier) of a character. A process of training the at least two font feature extraction sub-models will be described in detail below in combination with the to-be-trained font feature extraction sub-model shown in FIG. 5.

In order to train the at least two font feature extraction sub-models, a first training sample set needs to be obtained firstly. It may be understood that in order to improve accuracy of the model, as many and rich training samples as possible may be obtained to create the training sample set in an actual application process.

For instance, the first training sample set includes a plurality of first training samples. Each first training sample includes a theoretical character image and a theoretical character stroke corresponding to a first training character, and a mask character stroke that masks part of the theoretical character stroke. It may be understood that the theoretical character image is an image of a Chinese character under a specific font, and the theoretical character stroke is information that reflects a theoretical writing order of a plurality of strokes of the Chinese character. Meanwhile, in order to enable a computer to understand features of the Chinese character from a deep perspective of Chinese character writing, part of the theoretical character stroke needs to be selected for mask processing. That is, some strokes of the Chinese character are shielded from participating in subsequent processing of the font feature extraction sub-model. It may be understood that after part of the theoretical character stroke is shielded, the mask character stroke corresponding to the Chinese character may be obtained.

Figure 5:
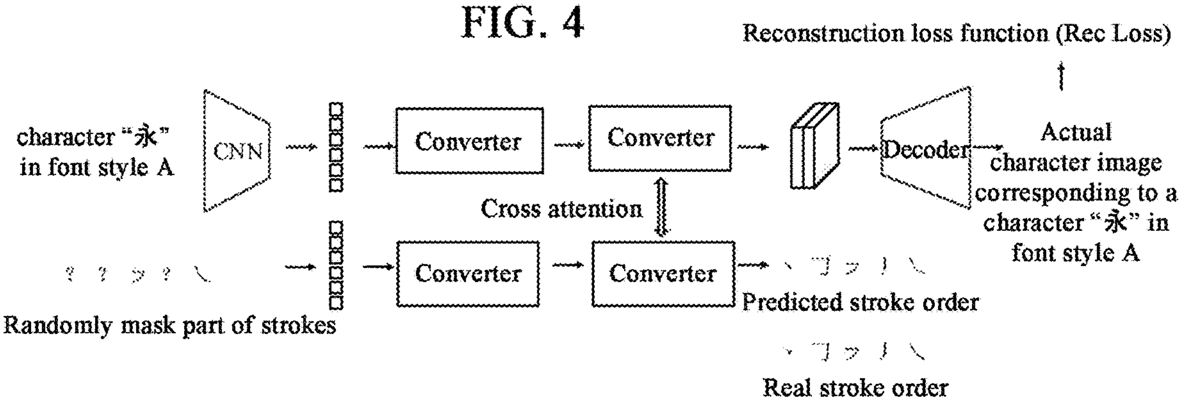
FIG. 5 shows a to-be-trained font feature extraction sub-model according to an example of the disclosure.

Taking FIG. 5 as an instance, in response to determining a character "永" to be the first training character, a character image corresponding to the character under a specific font is the theoretical character image, and five strokes constituting the character "永" and an order are the theoretical character stroke. For instance, the theoretical character stroke is masked, that is, first, second and fourth strokes of the five strokes of the character "永" are shielded, and then the mask character stroke corresponding to the character "永" is obtained.

For instance, for the plurality of first training samples, a theoretical character image and a mask character stroke in a current first training sample are input into a to-be-trained font feature extraction sub-model, and an actual character image and a predicted character stroke corresponding to the current first training sample are obtained. With reference to FIG. 5, an image that reflects a style of the character "永" under a specific font and the mask character stroke in which the first, second and fourth strokes are shielded are separately input into the corresponding to-be-trained font feature extraction sub-model, such that a character image output by the model and a complete character stroke predicted by the model for the character "永" may be obtained.

In the above process of determining the actual character image, for instance, an image feature corresponding to the theoretical character image is extracted, the image feature is compressed, and a first to-be-used feature is obtained; a feature vector corresponding to the mask character stroke is processed, and a second to-be-used feature is obtained; and feature interaction is conducted on the first to-be-used feature and the second to-be-used feature, and a character image feature corresponding to the first to-be-used feature and an actual stroke feature corresponding to the second to-be-used feature are obtained.

With reference to FIG. 5, after the image feature corresponding to the character "永" is extracted on the basis of a CNN model, the image feature extracted is compressed on the basis of a converter model, and then the first to-be-used feature may be obtained. In the same way, the feature vector of the mask character stroke is processed on the basis of the converter model, such that the second to-be-used feature may be obtained. For instance, cross attention processing is conducted on the first to-be-used feature and the second to-be-used feature, such that feature interaction is implemented between character image information and character stroke information, and then a character image feature corresponding to the character "永" and an actual stroke feature of the character "永" may be obtained.

It should be noted that the to-be-trained font feature extraction sub-model includes a decoding module, that is, a decoder module shown in FIG. 5. On the basis of the above description, after the character image feature and the actual stroke feature are obtained, the predicted character stroke is obtained on the basis of the actual stroke feature, the character image feature is decoded on the basis of the decoding module, and the actual character image is obtained. With reference to FIG. 5, after the character image feature and the actual stroke feature of the character "永" are obtained, a predicted stroke of the character "永" may be obtained. For instance, the character image feature of the character "永" is decoded on the basis of the decoder module, such that the actual character image corresponding to the character "永" and output by the to-be-trained font feature extraction sub-model is obtained.

It may be understood that in the example, the above process of inputting the plurality of first training samples into the to-be-trained font feature extraction sub-model and obtaining the predicted character strokes and the actual character images corresponding to characters in the samples is a process of enabling the computer to understand features of Chinese characters from a deep perspective of Chinese character writing.

In a process of training at least two font feature extraction sub-models, optimization of model parameters is also involved. For instance, loss processing is conducted on the actual character image and the theoretical character image on the basis of a first preset loss function in the to-be-trained feature extraction sub-model, loss processing is conducted on the predicted character stroke and the theoretical character stroke on the basis of a second preset loss function, and a model parameter in the to-be-trained font feature extraction sub-model is corrected according to a plurality of loss values obtained; and convergence of the first preset loss function and the second preset loss function is set as a training target, and a to-be-used font feature extraction sub-model is obtained.

In the example, parameters in the to-be-trained feature extraction sub-model may be corrected on the basis of the first preset loss function. Herein, illustration will be provided with the first preset loss function of the to-be-trained font feature extraction sub-model as an instance. For instance, on the basis of a to-be-trained font feature extraction sub-model, after a plurality of sets of actual character images and theoretical character images are obtained for a plurality of characters in the training sample set, the plurality of corresponding loss values may be determined. For instance, when the model parameter of the sub-model is corrected with the plurality of loss values and the first preset loss function, a training error of the loss function, that is, a loss parameter, may be configured to detect whether the loss function reaches a convergence condition currently, and for instance, whether the training error is smaller than a preset error or whether an error change trend tends to be stable, or whether a current iteration number is equal to a preset number. In response to detecting that a convergence condition is reached, and for instance, the training error of the loss function is smaller than the preset error, or the error change trend tends to be stable, training of the to-be-trained font feature extraction sub-model is completed. In this case, iterative training may be stopped. In response to detecting that the convergence condition is not reached currently, actual character images and theoretical character images corresponding to other characters may be obtained to further train the model until the training error of the loss function is within a preset range. When the training error of the loss function reaches convergence, the trained to-be-trained font feature extraction sub-model may be used as the to-be-used font feature extraction sub-model. That is, after a theoretical character image of a certain character is input into the to-be-used font feature extraction sub-model, an actual character image corresponding to the character may be obtained.

For the to-be-trained feature extraction sub-model that is configured to process a character stroke, the model parameter may be corrected in the same way as mentioned above on the basis of the second preset loss function and the plurality of sets of predicted character strokes and theoretical character strokes, which will not be repeated in the example of the disclosure.

In the example, after training of at least two to-be-trained font feature extraction sub-models and the corresponding to-be-used font feature extraction sub-model is obtained, the parameters in the model are frozen, such that high-quality feature information may be provided for a subsequent character processing process.

Figure 6:
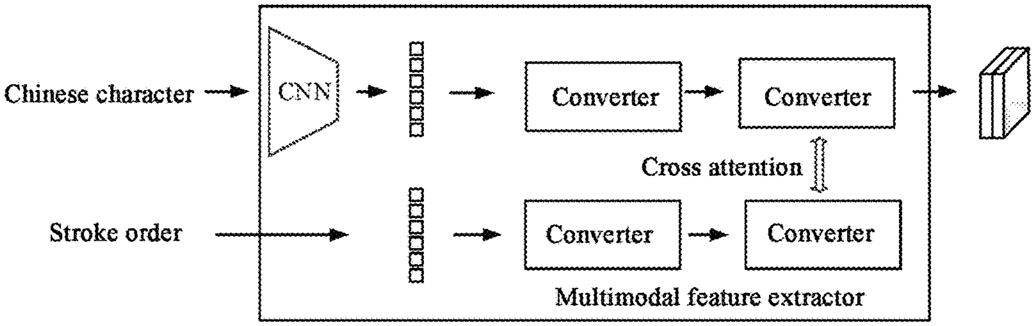
FIG. 6 shows a trained font feature extraction sub-model according to an example of the disclosure.

Meanwhile, in order to insert the to-be-used font feature extraction sub-model into an entire model network structure, the to-be-used font feature extraction sub-model needs to be eliminated, such that the font feature extraction sub-model may be obtained. For instance, when the to-be-trained font feature extraction sub-model includes the decoding module, the decoding module in the to-be-used font feature extraction sub-model is eliminated, and the font feature extraction sub-model in the style type conversion model is obtained. As shown in FIG. 6, after any Chinese character is input into the font feature extraction sub-model, the sub-model may process a style type feature and a character content feature of the Chinese character, and then obtain multimodal features of the Chinese character, such as a stroke order, a form and a structure of a Chinese character, a character meaning or a character identifier of the Chinese character under a current font. It should be understood by those skilled in the art that for the font feature extraction sub-model after the decoding module is eliminated, a feature map associated with characters before being input into the decoding module is output of the font feature extraction sub-model. Meanwhile, a two-dimensional feature map corresponding to each convolutional layer in a CNN model may be used as input of decoupling model in subsequent processing, which may retain more spatial information.

S320, a character to be displayed and a pre-selected target style type are obtained.

S330, the character to be displayed is converted into a target character corresponding to the target style type.

S340, the target character is displayed on a target display interface.

According to the technical solution of the example, the at least two to-be-trained font feature extraction sub-models in the style type conversion model are trained on the basis of the first training sample. For instance, parameters of the sub-models are optimized on the basis of the first preset loss function and the second preset loss function respectively, and finally the decoding module is eliminated, such that a multimodal feature extractor in the style type conversion model may be obtained.

Figure 7:
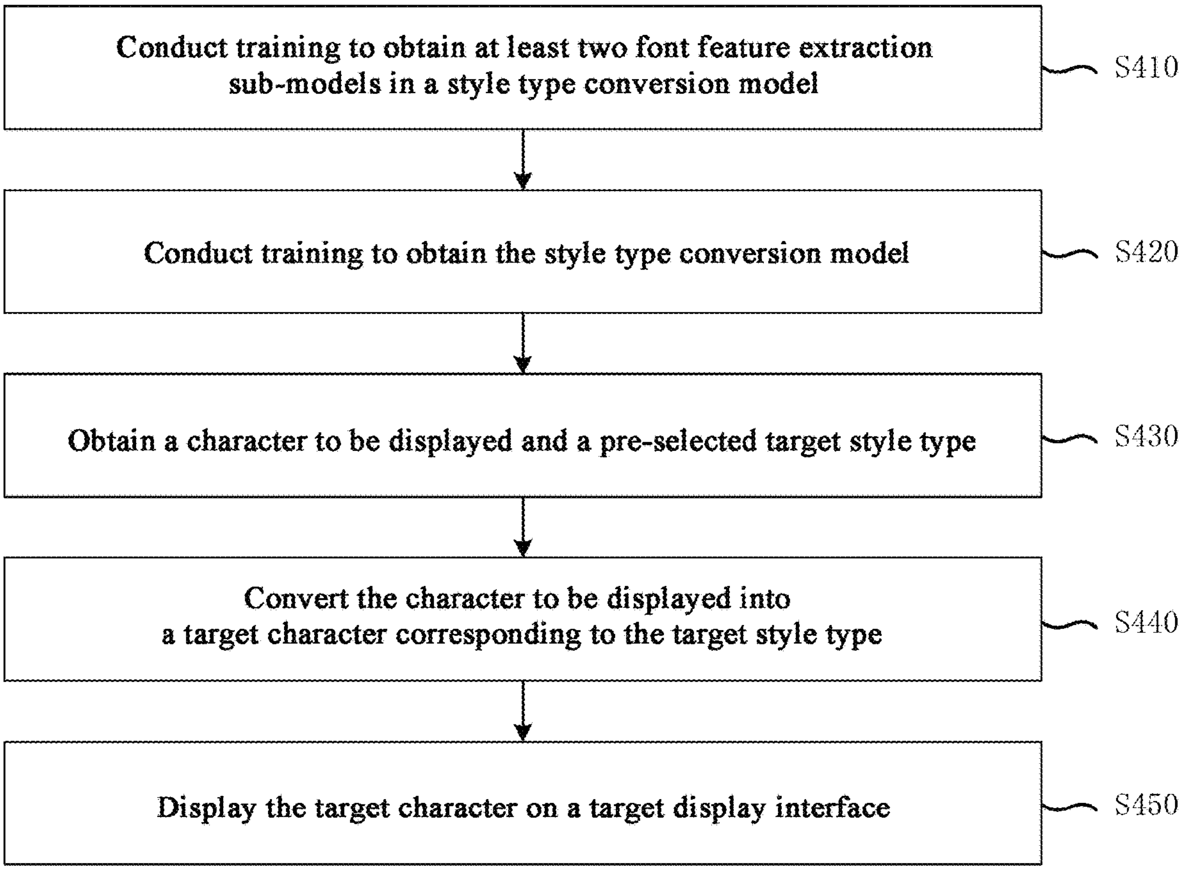
FIG. 7 is a schematic flow diagram of a method for generating a character according to still another example of the disclosure.

FIG. 7 is a schematic flow diagram of a method for generating a character according to still another example of the disclosure. On the basis of the above example, after a font feature extraction sub-model is trained, a style type conversion model is trained on the basis of a second training sample set, such that the trained style type conversion model is obtained. In a training process, parameters in the model are optimized with at least three preset loss functions, and therefore an error rate of a target character generated by the model is reduced. Reference may be made to the technical solution of the example for the illustrative embodiment. Technical terms the same as or corresponding to the above example are not repeated herein.

As shown in FIG. 7, the method includes the following steps:

S410, training is conducted to obtain at least two font feature extraction sub-models in the style type conversion model.

S420, training is conducted to obtain the style type conversion model.

In the example, after the at least two font feature extraction sub-models are trained, that is, after a multimodal feature extractor in the style type conversion model is obtained, the style type conversion model needs to be trained.

In a training process, a second training sample set needs to be obtained firstly. The second training sample set includes a plurality of second training samples. The second training sample includes two sets of to-be-processed sub-data and calibration data. A first set of to-be-processed sub-data includes a second character image and a second character stroke order corresponding to a to-be-trained character. A second set of to-be-processed sub-data includes a third character image and a third character stroke order of the target style type. The calibration data includes a fourth character image corresponding to the second character image in the target style type.

For instance, the first set of to-be-processed sub-data may include a plurality of characters having a copyrighted song typeface. Accordingly, the second character image reflects effects of the characters in a style type of the copyrighted song typeface. The second character stroke order indicates a stroke order used when the characters are written in the copyrighted song typeface. It may be understood that the second set of to-be-processed sub-data may include characters having another font. Accordingly, the third character image and the third character stroke order may also reflect effects and stroke orders of the characters in another font style type, which will not be repeated in the example of the disclosure.

After the second training sample set is obtained, for instance, for the plurality of second training samples, a current second training sample is input into a to-be-trained style type conversion model, and an actual character image corresponding to the current second training sample is obtained. The to-be-trained style type conversion model includes the first font feature extraction sub-model, the second font feature extraction sub-model, a first to-be-trained decoupling model, a second to-be-trained decoupling model, a to-be-trained feature splicing sub-model, and a to-be-trained feature processing sub-model. It should be understood by those skilled in the art that for the above plurality of models to be trained, although the parameters in the models are not completely trained, the models may still achieve functions introduced in the example of the disclosure to a certain extent.

For instance, a second character image and a second character stroke order in the current training sample are processed on the basis of the first font feature extraction sub-model, and a second to-be-decoupled character feature of the second character image is obtained. A third character image and a third character stroke order in the current training sample are processed on the basis of the second font feature extraction sub-model, and a third to-be-decoupled character feature of the third character image is obtained. The second to-be-decoupled character feature is decoupled on the basis of the first to-be-trained decoupling model, and a second style type feature and a second character content feature of the second character image are obtained. The third to-be-decoupled character feature is decoupled on the basis of the second to-be-trained decoupling model, and a third style type feature and a third character content feature of the third character image are obtained. The third style type feature and the second character content feature are spliced on the basis of the to-be-trained feature splicing sub-model, and the actual character image corresponding to the current second training sample is obtained.

Taking FIG. 3 as an instance, when a character image and a character stroke order of the character "永" are used as the second character image and the second character stroke order, the character image and the character stroke order of the character "永" may be input into a multimedia feature extractor (that is, the first font feature extraction sub-model trained), such that the second to-be-decoupled character feature may be obtained, which reflects the style type feature and the character content feature of the character "永". When a character image and a character stroke order of the character "春" are used as the third character image and the third character stroke order, the character image and the character stroke order of the character "春" may be input into the multimedia feature extractor, such that the third to-be-decoupled character feature may be obtained, which reflects the style type feature and the character content feature of the character "春".

For instance, the second to-be-decoupled character feature and the third to-be-decoupled character feature are decoupled with corresponding decoupling networks, such that the style type feature and the character content feature of the character "永" may be distinguished, and the style type feature and the character content feature of the character "春" may be distinguished.

Finally, the character content feature of the character "永" and the style type feature of the character "春" are spliced on the basis of the to-be-trained feature splicing sub-model, such that the actual character image of the character "永" may be obtained. It may be understood that when the model is not completely trained, the character "永" in the actual character image may present a style of a font of the character "春" to a certain extent. Only after the model is trained completely, the actual character image obtained may completely present the target style type. It may be understood as that a style type corresponding to the style type conversion model matches the target style type in the second set of to-be-processed sub-data.

Loss processing is conducted on the actual character image and the fourth character image on the basis of at least three preset loss functions in the to-be-trained style type conversion model, and model parameters of the first to-be-trained decoupling model, the second to-be-trained decoupling model, the to-be-trained feature splicing sub-model and the to-be-trained feature processing sub-model in the to-be-trained style type conversion model are corrected according to loss values obtained. Convergence of the at least three preset loss functions is set as a training target, and the style type conversion model is obtained.

In an actual application process, the three preset loss functions may include a reconstruction loss function (Rec Loss), a stroke order loss function (Stroke Order Loss), and an adversarial loss function (Adv Loss). For instance, the reconstruction loss function is configured to visually constrain whether network output meets expectations. The stroke order loss function may pre-train a self-designed recurrent neural network (RNN) capable of predicting stroke order information. The number of nodes in the RNN is the largest number of strokes of Chinese characters, and predicted features of all the nodes are combined through a connection function, such that a stroke order feature matrix is formed. Stroke order loss may be obtained by computing a loss value between the actual character image corresponding to the second training sample generated by a network and the stroke order feature matrix of the fourth character image in the target style type. An error rate of the target character obtained may be greatly reduced in a character generation process through processing of the stroke order loss function. The adversarial loss function may use a discriminator structure corresponding to an auxiliary classifier generative adversarial network (ACGAN). For instance, a discriminator not only determines authenticity of a font (that is, a font in the actual character image corresponding to the second training sample) finally generated by the model, but also classifies a type of the font finally generated. By deploying the discriminator in the model, the error rate of the target text obtained by the model is reduced.

S430, a character to be displayed and a pre-selected target style type are obtained.

S440, the character to be displayed is converted into a target character corresponding to the target style type.

S450, the target character is displayed on a target display interface.

According to the technical solution of the example, after the font feature extraction sub-model is trained, the style type conversion model is trained on the basis of the second training sample set, such that the trained style type conversion model is obtained. In a training process, parameters in the model are optimized with at least three preset loss functions, and therefore an error rate of the target character generated by the model is reduced.

Figure 8:
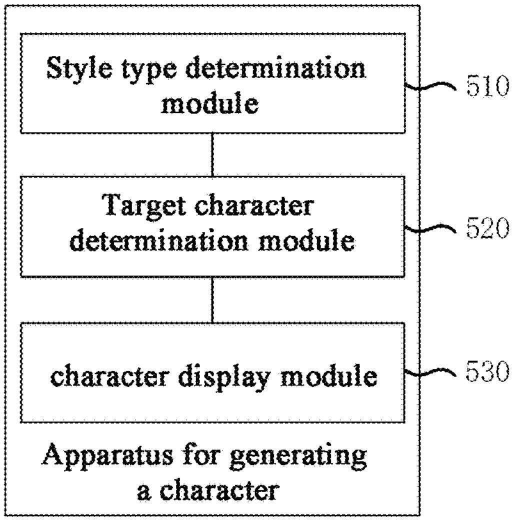
FIG. 8 is a structural block diagram of an apparatus for generating a character according to an example of the disclosure.

FIG. 8 is a structural block diagram of an apparatus for generating a character according to an example of the disclosure, which may execute the method for generating a character according to any one of the examples of the disclosure, and has corresponding functional modules and beneficial effects corresponding to execution of the method. As shown in FIG. 8, the apparatus includes: a style type determination module 510, a target character determination module 520, and a character display module 530.

The style type determination module 510 is configured to obtain a character to be displayed and a pre-selected target style type.

The target character determination module 520 is configured to convert the character to be displayed into a target character corresponding to the target style type. The target character is generated in advance on the basis of a style type conversion model and/or generated in real time on the basis of a style type conversion model.

The character display module 530 is configured to display the target character on a target display interface.

For instance, the style type determination module 510 is further configured to determine the target style type selected from a style type list in response to detecting that the character to be displayed is edited. The style type list includes a style type corresponding to the style type conversion model.

For instance, the target character determination module 520 is further configured to: obtain a target character consistent with the character to be displayed from a target character package corresponding to the target style type, where the target character package is generated after a plurality of characters are converted into a target font on the basis of the style type conversion model; and alternatively, input the character to be displayed into the style type conversion model, and obtain a target character corresponding to the target font.

On the basis of the plurality of technical solutions, the style type conversion model includes a first font feature extraction sub-model, a second font feature extraction sub-model, a first decoupling model connected to the first font feature extraction sub-model, a second decoupling model connected to the second font feature extraction sub-model, a feature splicing sub-model connected to the first decoupling model and the second decoupling model, and a feature processing sub-model. The first font feature extraction sub-model and the second font feature extraction sub-model have the same model structure, and are configured to determine character features of a plurality of characters. The character features include a style type feature and a character content feature. The decoupling model is configured to decouple the character feature extracted by the font feature extraction sub-model, so as to distinguish the style type feature from the character content feature. The feature splicing sub-model is configured to splice the character features extracted by the decoupling model, so as to obtain a corresponding character style feature. The feature processing sub-model is configured to process the character style feature, so as to obtain the target character of the character to be displayed in the target style type.

For instance, the target character determination module 520 is further configured to: determine a first to-be-decoupled character feature of the character to be displayed on the basis of the first font feature extraction sub-model, and determine a second to-be-decoupled character feature of a target style character on the basis of the second font feature extraction sub-model, where a character type of the target style character is consistent with the target style type; process the first to-be-decoupled character feature on the basis of the first decoupling model, and obtain a to-be-displayed style type feature and a to-be-displayed content feature of the character to be displayed; process the second to-be-decoupled character feature on the basis of the second decoupling model, and obtain the target style type and a target content feature of the target style character; obtain the to-be-displayed content feature and the target style type on the basis of the feature splicing sub-model, and obtain a character style feature corresponding to the character to be displayed; and process the character style feature on the basis of the feature processing sub-model, and obtain the target character corresponding to the character to be displayed in the target style type.

On the basis of the plurality of technical solutions, the apparatus for generating a character further includes a font feature extraction sub-model training module.

The font feature extraction sub-model training module is configured to conduct training to obtain at least two font feature extraction sub-models in the style type conversion model.

On the basis of the plurality of technical solutions, the font feature extraction sub-model training module includes a first training sample set obtaining unit, a first training sample processing unit, a first correction unit, a to-be-used font feature extraction sub-model determination unit, and a font feature extraction sub-model determination unit.

The first training sample set obtaining unit is configured to obtain a first training sample set. The first training sample set includes a plurality of first training samples. Each first training sample includes a theoretical character image and a theoretical character stroke corresponding to a first training character, and a mask character stroke that masks part of the theoretical character stroke.

The first training sample processing unit is configured to input, for the plurality of first training samples, a theoretical character image and a mask character stroke in a current first training sample into a to-be-trained font feature extraction sub-model, and obtain an actual character image and a predicted character stroke corresponding to the current first training sample.

The first correction unit is configured to conduct loss processing on the actual character image and the theoretical character image on the basis of a first preset loss function in the to-be-trained feature extraction sub-model, conduct loss processing on the predicted character stroke and the theoretical character stroke on the basis of a second preset loss function, and correct a model parameter in the to-be-trained font feature extraction sub-model according to a plurality of loss values obtained.

The to-be-used font feature extraction sub-model determination unit is configured to set convergence of the first preset loss function and the second preset loss function as a training target, and obtain a to-be-used font feature extraction sub-model.

The font feature extraction sub-model determination unit is configured to eliminate the to-be-used font feature extraction sub-model, and obtain the font feature extraction sub-models.

On the basis of the plurality of technical solutions, the to-be-trained font feature extraction sub-model includes a decoding module.

For instance, the first training sample processing unit is further configured to: extract an image feature corresponding to the theoretical character image, compress the image feature, and obtain a first to-be-used feature; process a feature vector corresponding to the mask character stroke, and obtain a second to-be-used feature; conduct feature interaction on the first to-be-used feature and the second to-be-used feature, and obtain a character image feature corresponding to the first to-be-used feature and an actual stroke feature corresponding to the second to-be-used feature; and obtain the predicted character stroke on the basis of the actual stroke feature, decode the character image feature on the basis of the decoding module, and obtain the actual character image.

For instance, the font feature extraction sub-model determination unit is further configured to eliminate the decoding module in the to-be-used font feature extraction sub-model, and obtain the font feature extraction sub-models in the style type conversion model.

On the basis of the plurality of technical solutions, the apparatus for generating a character further includes a style type conversion model training module.

The style type conversion model training module is configured to conduct training to obtain the style type conversion model.

On the basis of the plurality of technical solutions, the style type conversion model training module includes a second training sample set obtaining unit, a second training sample processing unit, a second correction unit, and a style type conversion model determination unit.

The second training sample set obtaining unit is configured to obtain a second training sample set. The second training sample set includes a plurality of second training samples. The second training sample includes two sets of to-be-processed sub-data and calibration data. A first set of to-be-processed sub-data includes a second character image and a second character stroke order corresponding to a to-be-trained character. A second set of to-be-processed sub-data includes a third character image and a third character stroke order of the target style type. The calibration data includes a fourth character image corresponding to the second character image in the target style type.

The second training sample processing unit is configured to input, for the plurality of second training samples, a current second training sample into a to-be-trained style type conversion model, and obtain an actual character image corresponding to the current second training sample. The to-be-trained style type conversion model includes the first font feature extraction sub-model, the second font feature extraction sub-model, a first to-be-trained decoupling model, a second to-be-trained decoupling model, a to-be-trained feature splicing sub-model, and a to-be-trained feature processing sub-model.

The second correction unit is configured to conduct loss processing on the actual character image and the fourth character image on the basis of at least three preset loss functions in the to-be-trained style type conversion model, and correct model parameters of the first to-be-trained decoupling model, the second to-be-trained decoupling model, the to-be-trained feature splicing sub-model and the to-be-trained feature processing sub-model in the to-be-trained style type conversion model according to loss values obtained.

The style type conversion model determination unit is configured to set convergence of the at least three preset loss functions as a training target, and obtain the style type conversion model.

For instance, the second training sample processing unit is further configured to: process a second character image and a second character stroke order in the current training sample on the basis of the first font feature extraction sub-model, and obtain a second to-be-decoupled character feature of the second character image; process a third character image and a third character stroke order in the current training sample on the basis of the second font feature extraction sub-model, and obtain a third to-be-decoupled character feature of the third character image; decouple the second to-be-decoupled character feature on the basis of the first to-be-trained decoupling model, and obtain a second style type feature and a second character content feature of the second character image; decouple the third to-be-decoupled character feature on the basis of the second to-be-trained decoupling model, and obtain a third style type feature and a third character content feature of the third character image; and splice the third style type feature and the second character content feature on the basis of the to-be-trained feature splicing sub-model, and obtain the actual character image corresponding to the current second training sample.

On the basis of the plurality of technical solutions, the style type corresponding to the style type conversion model matches the target style type in the second set of to-be-processed sub-data.

According to the technical solution provided by the example, the character to be displayed and the pre-selected target style type are obtained; then the character to be displayed is converted into the target character having the target style type, where the target character is generated in advance on the basis of a style type conversion model and/or generated in real time on the basis of the style type conversion model; and finally, the target character is displayed on the target display interface. An artificial intelligence model is introduced to generate a font in a specific style, which not only provides a concise and efficient character design solution, but also avoids low efficiency, high cost and inability to accurately obtain an expected font in a manual design process in the related art.

The apparatus for generating a character according to the example of the disclosure may execute the method for generating a character according to any one of the examples of the disclosure, and has corresponding functional modules and beneficial effects corresponding to execution of the method.

It should be noted that a plurality of units and modules included in the apparatus are merely divided according to a functional logic, but are not limited to the above division, as long as the corresponding functions may be achieved. In addition, specific names of a plurality of functional units are merely for convenience of mutual distinguishing, and are not used to limit the protective scope of the example of the disclosure.

Figure 9:
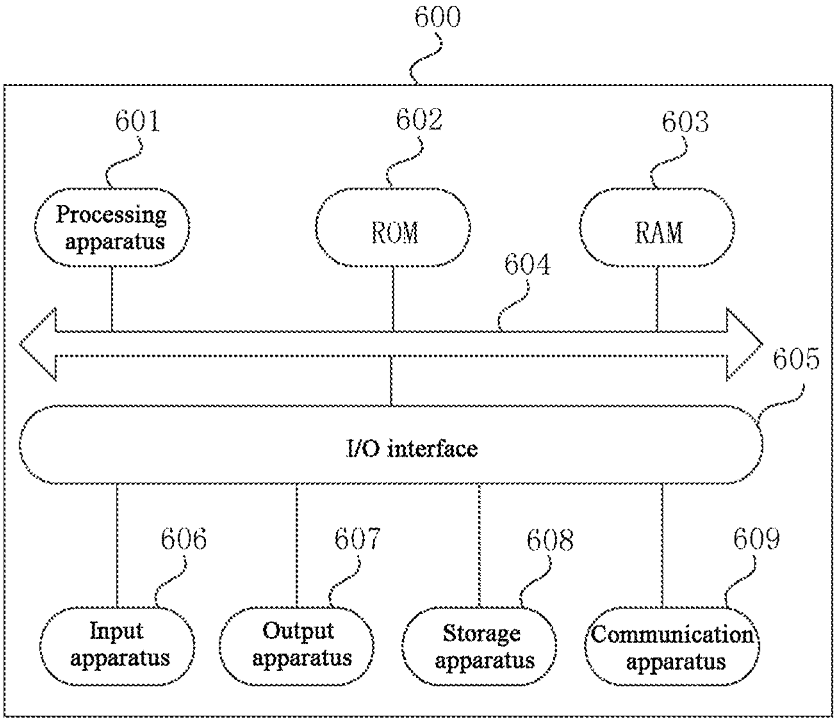
FIG. 9 is a schematic structural diagram of an electronic device according to an example of the disclosure.

FIG. 9 is a schematic structural diagram of an electronic device according to an example of the disclosure. FIG. 9 shows a schematic structural diagram of an electronic device (for instance, a terminal device or a server in FIG. 9) 600 suitable for implementing an example of the disclosure below. The terminal device according to the example of the disclosure may be, but is not limited to, a mobile terminal such as a mobile phone, a notebook computer, a digital broadcast receiver, a personal digital assistant (PDA), a portable android device (PAD), a portable multimedia player (PMP), or a vehicle-mounted terminal (for instance, a vehicle-mounted navigation terminal), and a fixed terminal such as a digital television (TV) or a desktop computer. The electronic device shown in FIG. 9 is only illustrative, and is not intended to limit functions and a use scope of the examples of the disclosure.

As shown in FIG. 9, the electronic device 600 may include a processing apparatus (for instance, a central processing unit or a graphics processing unit) 601, which may execute various appropriate actions and processing according to a program stored in a read only memory (ROM) 602 or a program loaded from a storage apparatus 606 to a random access memory (RAM) 603. The RAM 603 further stores various programs and data required for operations of the electronic device 600. The processing apparatus 601, the ROM 602 and the RAM 603 are connected to one another by means of a bus 604. An input/output (I/O) interface 605 is further connected to the bus 604.

Generally, apparatuses that may be connected to the I/O interface 605 include the following: an editing apparatus 606 including, for instance, a touch screen, a touch pad, a keyboard, a mouse, a camera, a microphone, an accelerometer, a gyroscope, etc.; an output apparatus 607 including, for instance, a liquid crystal display (LCD), a speaker, a vibrator, etc.; the storage apparatus 608 including, for instance, a magnetic tape, a hard disk, etc.; and a communication apparatus 609. The communication apparatus 609 may allow the electronic device 600 to be in wireless or wired communication with other devices so as to achieve data exchange. Although FIG. 9 shows the electronic device 600 including various apparatuses, it should be understood that not all the apparatuses shown are required to be implemented or included. More or fewer apparatuses may be alternatively implemented or included.

According to the example of the disclosure, the process described above with reference to the flow diagram may be implemented to be a computer software program. For instance, an example of the disclosure includes a computer program product, which includes a computer program born by a non-transitory computer-readable medium. The computer program includes a program code configured to execute the method shown in the flow diagram. In such an example, the computer program may be downloaded and installed from a network through the communication apparatus 609, or installed from the storage apparatus 606, or installed from the ROM 602. The computer program executes the functions defined in the method according to the example of the disclosure when being executed by the processing apparatus 601.

Names of messages or information exchanged between a plurality of apparatuses in the embodiment of the disclosure are only for illustrative purposes, instead of limiting the scope of the messages or information.

The electronic device according to the example of the disclosure belongs to the same concept as the method for generating a character according to the above examples. Reference may be made to the above examples for technical details not described in detail in the example. The example has the same beneficial effects as the above examples.

An example of the disclosure provides a computer storage medium, which stores a computer program. The computer program implements the method for generating a character according to the example when being executed by a processor.

It should be noted that the computer-readable medium described in the disclosure may be a computer-readable signal medium, or a computer-readable storage medium, or any combination thereof. For instance, the computer-readable storage medium may be, but is not limited to, an electronic, magnetic, optical, electromagnetic, infrared, or semiconductor system, apparatus, or device, or any suitable combination thereof. More specific instances of the computer-readable storage medium may include, but are not limited to, an electrical connection having on one or more wires, a portable computer disk, a hard disk, a random access memory (RAM), a read only memory (ROM), an erasable programmable read only memory (EPROM or a flash memory), an optical fiber, a portable compact disk read only memory (CD-ROM), an optical storage device, a magnetic storage device, or any suitable combination thereof. In the disclosure, the computer-readable storage medium may be any tangible medium including or storing a program. The program may be used by or in combination with an instruction execution system, apparatus or device. In the disclosure, the computer-readable signal medium may include a data signal in a baseband or as part of a carrier for transmission, and the data signal carries a computer-readable program code. The transmitted data signal may be in various forms, and may be, but is not limited to, an electromagnetic signal, an optical signal, or any suitable combination thereof. The computer-readable signal medium may further be any computer-readable medium other than the computer-readable storage medium. The computer-readable signal medium may transmit, propagate or transmit a program used by or in combination with an instruction execution system, apparatus or device. The program code included in the computer-readable medium may be transmitted by any suitable medium, which may be, but is not limited to, an electric wire, an optical cable, radio frequency (RF), etc., or any suitable combination thereof.

In some embodiments, a client and a server may be in communication with each other with any currently known or future-developed network protocol, for instance, a hypertext transfers protocol (HTTP), and may be interconnected with digital data communication (for instance, a communication network) in any form or medium. Instances of the communication network include a local area network (LAN), a wide area network (WAN), the internet work (for instance, the Internet), an end-to-end network (for instance, an ad hoc end-to-end network), and any networks known at present or developed in future.

The computer-readable medium may be included in the electronic device, or may exist independently without being assembled into the electronic device.

The computer-readable medium carries one or more programs. When the one or more programs are executed by the electronic device, the electronic device is caused to:

obtain a character to be displayed and a pre-selected target style type;

convert the character to be displayed into a target character corresponding to the target style type, where the target character is generated in advance on the basis of a style type conversion model and/or generated in real time on the basis of a style type conversion model; and display the target character on a target display interface.

A computer program code configured to execute an operation of the disclosure may be written in one or more programming languages or a combination thereof. The programming languages include, but are not limited to, object-oriented programming languages such as Java, Smalltalk, and C++, and further include conventional procedural programming languages such as "C" or similar programming languages. The program code may be executed entirely on a user computer, executed partially on a user computer, executed as a stand-alone software package, executed partially on a user computer and partially on a remote computer, or executed entirely on the remote computer or a server. In the case involving the remote computer, the remote computer may be connected to the user computer through any type of networks including the local area network (LAN) or the wide area network (WAN), or may be connected to an external computer (for instance, the remote computer is connected through the Internet by an Internet service provider).

The flow diagrams and block diagrams in the accompanying drawings illustrate system structures, functions and operations, which may be achieved according to systems, methods and computer program products in all the examples of the disclosure. In view of that, each block in the flow diagrams or block diagrams may represent a module, a program segment, or part of a code, which includes one or more executable instructions configured to implement specified logic functions. It should further be noted that in some alternative implementations, the functions noted in the blocks may also occur in an order different from that in the accompanying drawings. For instance, the functions represented by two continuous blocks may be actually implemented basically in parallel, or may be implemented in reverse orders, which depends on the involved functions. It should further be noted that each block in the block diagrams and/or flow diagrams and combinations of the blocks in the block diagrams and/or the flow diagrams may be implemented with dedicated hardware-based systems that implement the specified functions or operations, or may be implemented with combinations of dedicated hardware and computer instructions.

The units involved in the examples described in the disclosure may be implemented by software or hardware. Names of the units do not limit the units themselves in some cases. For instance, a first obtaining unit may also be described as "a unit obtaining at least two Internet protocol addresses".

The functions described herein may be at least partially executed by one or more hardware logic components. For instance, illustrative types of hardware logic components that may be used include, but are not limited to, a field programmable gate array (FPGA), an application-specific integrated circuit (ASIC), an application-specific standard product (ASSP), a system on chip (SOC), a complex programmable logic device (CPLD), etc.

In the context of the disclosure, the machine-readable medium may be a tangible medium, which may include or store a program used by or used in combination with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific instances of the machine-readable storage medium may include an electrical connection on the basis of one or more wires, a portable computer disk, a hard disk, a random access memory (RAM), a read only memory (ROM), an erasable programmable read only memory (EPROM or a flash memory), an optical fiber, a portable compact disk read only memory (CD-ROM), an optical storage device, a magnetic storage device, or any suitable combination thereof.

According to one or more examples of the disclosure, [Instance 1] provides a method for generating a character. The method includes the following steps:

a character to be displayed and a pre-selected target style type are obtained;

the character to be displayed is converted into a target character corresponding to the target style type, where the target character is generated in advance on the basis of a style type conversion model and/or generated in real time on the basis of a style type conversion model; and the target character is displayed on a target display interface.

According to one or more examples of the disclosure, [Instance 2] provides a method for generating a character. The step that the character to be displayed and the pre-selected target style type are obtained includes the following step:

the target style type selected from a style type list is determined in response to detecting that the character to be displayed is edited.

The style type list includes a style type corresponding to the style type conversion model.

According to one or more examples of the disclosure, [Instance 3] provides a method for generating a character. The step that the character to be displayed is converted into the target character corresponding to the target style type includes the following step:

a target character consistent with the character to be displayed is obtained from a target character package corresponding to the target style type, where the target character package is generated after a plurality of characters are converted into a target font on the basis of the style type conversion model; or the character to be displayed is input into the style type conversion model, and a target character corresponding to the target font is obtained.

According to one or more examples of the disclosure, [Instance 4] provides a method for generating a character.

The style type conversion model includes a first font feature extraction sub-model, a second font feature extraction sub-model, a first decoupling model connected to the first font feature extraction sub-model, a second decoupling model connected to the second font feature extraction sub-model, a feature splicing sub-model connected to the first decoupling model and the second decoupling model, and a feature processing sub-model.

The first font feature extraction sub-model and the second font feature extraction sub-model have the same model structure, and are configured to determine character features of a plurality of characters respectively, and the character features include a style type feature and a character content feature. The decoupling model is configured to decouple the character feature extracted by the font feature extraction sub-model, so as to distinguish the style type feature from the character content feature. The feature splicing sub-model is configured to splice the character features extracted by the decoupling model, so as to obtain a corresponding character style feature. The feature processing sub-model is configured to process the character style feature, so as to obtain the target character of the character to be displayed in the target style type.

According to one or more examples of the disclosure, [Instance 5] provides a method for generating a character. The step that the target character is generated in advance on the basis of the style type conversion model includes the following steps:

a first to-be-decoupled character feature of the character to be displayed is determined on the basis of the first font feature extraction sub-model, and a second to-be-decoupled character feature of a target style character is determined on the basis of the second font feature extraction sub-model, where a character type of the target style character is consistent with the target style type;

the first to-be-decoupled character feature is processed on the basis of the first decoupling model, and a to-be-displayed style type feature and a to-be-displayed content feature of the character to be displayed are obtained; and the second to-be-decoupled character feature is processed on the basis of the second decoupling model, and the target style type and a target content feature of the target style character are obtained;

the to-be-displayed content feature and the target style type are obtained on the basis of the feature splicing sub-model, and a character style feature corresponding to the character to be displayed is obtained; and the character style feature is processed on the basis of the feature processing sub-model, and the target character corresponding to the character to be displayed in the target style type is obtained.

According to one or more examples of the disclosure, [Instance 6] provides a method for generating a character. The method further includes the following step:

training is conducted to obtain at least two font feature extraction sub-models in a style type conversion model.

The step that training is conducted to obtain the at least two font feature extraction sub-models in the style type conversion model includes the following steps:

a first training sample set is obtained, where the first training sample set includes a plurality of first training samples, and each first training sample includes a theoretical character image and a theoretical character stroke corresponding to a first training character, and a mask character stroke that masks part of the theoretical character stroke;

for the plurality of first training samples, a theoretical character image and a mask character stroke in a current first training sample are input into a to-be-trained font feature extraction sub-model, and an actual character image and a predicted character stroke corresponding to the current first training sample are obtained;

loss processing is conducted on the actual character image and the theoretical character image on the basis of a first preset loss function in the to-be-trained feature extraction sub-model, loss processing is conducted on the predicted character stroke and the theoretical character stroke on the basis of a second preset loss function, and a model parameter in the to-be-trained font feature extraction sub-model is corrected according to a plurality of loss values obtained;

convergence of the first preset loss function and the second preset loss function is set as a training target, and a to-be-used font feature extraction sub-model is obtained; and the to-be-used font feature extraction sub-model is eliminated, and the font feature extraction sub-models are obtained.

According to one or more examples of the disclosure, [Instance 7] provides a method for generating a character. The to-be-trained font feature extraction sub-model includes a decoding module.

The steps that the theoretical character image and the mask character stroke in the current first training sample are input into the to-be-trained font feature extraction sub-model, and the actual character image and the predicted character stroke corresponding to the current first training sample are obtained include the following steps:

an image feature corresponding to the theoretical character image is extracted, the image feature is compressed, and a first to-be-used feature is obtained;

a feature vector corresponding to the mask character stroke is processed, and a second to-be-used feature is obtained;

feature interaction is conducted on the first to-be-used feature and the second to-be-used feature, and a character image feature corresponding to the first to-be-used feature and an actual stroke feature corresponding to the second to-be-used feature are obtained; and the predicted character stroke is obtained on the basis of the actual stroke feature, the character image feature is decoded on the basis of the decoding module, and the actual character image is obtained.

According to one or more examples of the disclosure, [Instance 8] provides a method for generating a character. The steps that the to-be-used font feature extraction sub-model is eliminated, and the font feature extraction sub-models are obtained include the following steps:

the decoding module in the to-be-used font feature extraction sub-model is eliminated, and the font feature extraction sub-model in the style type conversion model is obtained.

According to one or more examples of the disclosure, [Instance 9] provides a method for generating a character. The method includes the following step:

training is conducted to obtain the style type conversion model.

The step that training is conducted to obtain the style type conversion model includes the following steps:

a second training sample set is obtained, where the second training sample set includes a plurality of second training samples, and the second training sample includes two sets of to-be-processed sub-data and calibration data, where a first set of to-be-processed sub-data includes a second character image and a second character stroke order corresponding to a to-be-trained character; a second set of to-be-processed sub-data includes a third character image and a third character stroke order of the target style type; and the calibration data includes a fourth character image corresponding to the second character image in the target style type;

for the plurality of second training samples, a current second training sample is input into a to-be-trained style type conversion model, and an actual character image corresponding to the current second training sample is obtained, where the to-be-trained style type conversion model includes the first font feature extraction sub-model, the second font feature extraction sub-model, a first to-be-trained decoupling model, a second to-be-trained decoupling model, a to-be-trained feature splicing sub-model, and a to-be-trained feature processing sub-model;

loss processing is conducted on the actual character image and the fourth character image on the basis of at least three preset loss functions in the to-be-trained style type conversion model, and model parameters of the first to-be-trained decoupling model, the second to-be-trained decoupling model, the to-be-trained feature splicing sub-model and the to-be-trained feature processing sub-model in the to-be-trained style type conversion model are corrected according to loss values obtained; and convergence of the at least three preset loss functions is set as a training target, and the style type conversion model is obtained.

According to one or more examples of the disclosure, [Instance 10] provides a method for generating a character. The steps that the current second training sample is input into the to-be-trained style type conversion model, and the actual character image corresponding to the current second training sample is obtained include the following steps:

a second character image and a second character stroke order in the current training sample are processed on the basis of the first font feature extraction sub-model, and a second to-be-decoupled character feature of the second character image is obtained; and a third character image and a third character stroke order in the current training sample are processed on the basis of the second font feature extraction sub-model, and a third to-be-decoupled character feature of the third character image is obtained;

the second to-be-decoupled character feature is decoupled on the basis of the first to-be-trained decoupling model, and a second style type feature and a second character content feature of the second character image are obtained;

the third to-be-decoupled character feature is decoupled on the basis of the second to-be-trained decoupling model, and a third style type feature and a third character content feature of the third character image are obtained; and the third style type feature and the second character content feature are spliced on the basis of the to-be-trained feature splicing sub-model, and the actual character image corresponding to the current second training sample is obtained.

According to one or more examples of the disclosure, [Instance 11] provides a method for generating a character. The style type corresponding to the style type conversion model matches the target style type in the second set of to-be-processed sub-data.

According to one or more examples of the disclosure, [Instance 12] provides an apparatus for generating a character. The apparatus includes:

a style type determination module configured to obtain a character to be displayed and a pre-selected target style type;

a target character determination module configured to convert the character to be displayed into a target character corresponding to the target style type, where the target character is generated in advance on the basis of a style type conversion model and/or generated in real time on the basis of a style type conversion model; and a character display module configured to display the target character on a target display interface.

Further, although various operations are depicted in a particular order, it should be understood that the operations are not required to be executed in the particular order shown or in a sequential order. In some cases, multitasking and parallel processing may be advantageous. Likewise, although several specific implementation details are included in the above discussion, the details should not be construed as limiting the scope of the disclosure. Some features described in the context of separate examples may also be implemented in combination in a single example. On the contrary, various features described in the context of a single example may also be implemented in a plurality of examples independently or in any suitable sub-combination way.

We claim:

1. A method for generating a character, comprising:

obtaining a character to be displayed and a pre-selected target style type;

converting the character to be displayed into a target character corresponding to the target style type, wherein the target character is generated in at least one of modes:

generating the target character in advance on the basis of a style type conversion model or generating the target character in real time on the basis of a style type conversion model, and wherein the style type conversion model comprises a first font feature extraction sub-model and a second font feature extraction sub-model;

displaying the target character on a target display interface; and wherein the method further comprises conducting training to obtain the first font feature extraction sub-model and the second font feature extraction sub-model, wherein conducting the training comprises:

obtaining a first training sample set, wherein the first training sample set comprises a plurality of first training samples, and each first training sample comprises a theoretical character image and a theoretical character stroke corresponding to a first training character, and a mask character stroke that masks part of the theoretical character stroke, inputting, for the plurality of first training samples, a theoretical character image and a mask character stroke in a current first training sample into a to-be-trained font feature extraction sub-model to obtain an actual character image and a predicted character stroke corresponding to the current first training sample, conducting loss processing on the actual character image and the theoretical character image on the basis of a first preset loss function in the to-be-trained feature extraction sub-model, and conducting loss processing on the predicted character stroke and the theoretical character stroke on the basis of a second preset loss function to correct a model parameter in the to-be-trained font feature extraction sub-model according to a plurality of loss values obtained, setting convergence of the first preset loss function and the second preset loss function as a training target to obtain a to-be-used font feature extraction sub-model, and conducting eliminating processing on the to-be-used font feature extraction sub-model to obtain the first and second font feature extraction sub-models.

2. The method of claim 1, wherein obtaining the character to be displayed and the pre-selected target style type comprises:

determining the target style type selected from a style type list in response to detecting that the character to be displayed is edited, wherein the style type list comprises a style type corresponding to the style type conversion model.

3. The method of claim 1, wherein converting the character to be displayed into the target character corresponding to the target style type comprises:

obtaining a target character consistent with the character to be displayed from a target character package corresponding to the target style type, wherein the target character package is generated after converting a plurality of characters into a target font on the basis of the style type conversion model; or inputting the character to be displayed into the style type conversion model to obtain a target character corresponding to the target font.

4. The method of claim 1, wherein the style type conversion model further comprises a first decoupling model connected to the first font feature extraction sub-model, a second decoupling model connected to the second font feature extraction sub-model, a feature splicing sub-model connected to the first decoupling model and the second decoupling model, and a feature processing sub-model;

wherein the first font feature extraction sub-model and the second font feature extraction sub-model have the same model structure, and are configured to determine character features of a plurality of characters respectively, and the character features comprise a style type feature and a character content feature; the first decoupling model is configured to decouple a character feature extracted by the first font feature extraction sub-model to distinguish the style type feature from the character content feature; the second decoupling model is configured to decouple a character feature extracted by the second font feature extraction sub-model to distinguish the style type feature from the character content feature; the feature splicing sub-model is configured to splice the character features extracted by the first decoupling model and the second decoupling model to obtain a corresponding character style feature; and the feature processing sub-model is configured to process the character style feature to obtain the target character of the character to be displayed in the target style type.

5. The method of claim 4, wherein generating the target character in advance on the basis of a style type conversion model comprises:

determining a first to-be-decoupled character feature of the character to be displayed on the basis of the first font feature extraction sub-model, and determining a second to-be-decoupled character feature of the target style character on the basis of the second font feature extraction sub-model, wherein a character type of the target style character is consistent with the target style type;

processing the first to-be-decoupled character feature on the basis of the first decoupling model to obtain a to-be-displayed style type feature and a to-be-displayed content feature of the character to be displayed; and processing the second to-be-decoupled character feature on the basis of the second decoupling model to obtain the target style type and a target content feature of the target style character;

obtaining the to-be-displayed content feature and the target style type on the basis of the feature splicing sub-model to obtain a character style feature corresponding to the character to be displayed;

processing the character style feature on the basis of the feature processing sub-model to obtain the target character corresponding to the character to be displayed in the target style type.

6. The method of claim 1, wherein the to-be-trained font feature extraction sub-model comprises a decoding module, and inputting a theoretical character image and a mask character stroke in a current first training sample into a to-be-trained font feature extraction sub-model to obtain an actual character image and a predicted character stroke corresponding to the current first training sample comprises:

extracting an image feature corresponding to the theoretical character image, and compressing the image feature to obtain a first to-be-used feature;

processing a feature vector corresponding to the mask character stroke to obtain a second to-be-used feature;

conducting feature interaction on the first to-be-used feature and the second to-be-used feature to obtain a character image feature corresponding to the first to-be-used feature and an actual stroke feature corresponding to the second to-be-used feature; and obtaining the predicted character stroke on the basis of the actual stroke feature, and decoding the character image feature on the basis of the decoding module to obtain the actual character image.

7. The method of claim 6, wherein conducting eliminating processing on the to-be-used font feature extraction sub-model to obtain the font feature extraction sub-models comprises:

conducting eliminating processing on the decoding module in the to-be-used font feature extraction sub-model to obtain the font feature extraction sub-models in the style type conversion model.

8. The method of claim 1, further comprising:

conducting training to obtain the style type conversion model;

wherein conducting training to obtain the style type conversion model comprises:

obtain a second training sample set, wherein the second training sample set comprises a plurality of second training samples, and the second training sample comprises two sets of to-be-processed sub-data and calibration data, wherein a first set of to-be-processed sub-data comprises a second character image and a second character stroke order corresponding to a to-be-trained character; a second set of to-be-processed sub-data comprises a third character image and a third character stroke order of the target style type; and the calibration data is a fourth character image corresponding to the second character image in the target style type;

inputting, for the plurality of second training samples, a current second training sample into a to-be-trained style type conversion model to obtain an actual character image corresponding to the current second training sample; wherein the to-be-trained style type conversion model comprises the first font feature extraction sub-model, the second font feature extraction sub-model, a first to-be-trained decoupling model, a second to-be-trained decoupling model, a to-be-trained feature splicing sub-model, and a to-be-trained feature processing sub-model;

conducting loss processing on the actual character image and the fourth character image on the basis of at least three preset loss functions in the to-be-trained style type conversion model to correct model parameters of the first to-be-trained decoupling model, the second to-be-trained decoupling model, the to-be-trained feature splicing sub-model and the to-be-trained feature processing sub-model in the to-be-trained style type conversion model according to loss values obtained;

setting convergence of the at least three preset loss functions as a training target to obtain the style type conversion model.

9. The method of claim 8, wherein inputting a current second training sample into a to-be-trained style type conversion model to obtain an actual character image corresponding to the current second training sample comprises:

processing a second character image and a second character stroke order in the current training sample on the basis of the first font feature extraction sub-model to obtain a second to-be-decoupled character feature of the second character image; and processing a third character image and a third character stroke order in the current training sample on the basis of the second font feature extraction sub-model to obtain a third to-be-decoupled character feature of the third character image;

decoupling the second to-be-decoupled character feature on the basis of the first to-be-trained decoupling model to obtain a second style type feature and a second character content feature of the second character image;

decoupling the third to-be-decoupled character feature on the basis of the second to-be-trained decoupling model to obtain a third style type feature and a third character content feature of the third character image; and splicing the third style type feature and the second character content feature on the basis of the to-be-trained feature splicing sub-model to obtain the actual character image corresponding to the current second training sample.

10. The method of claim 8, wherein the style type corresponding to the style type conversion model matches the target style type in the second set of to-be-processed sub-data.

11. An electronic device, comprising:

one or more processors; and a storage apparatus configured to store one or more programs, wherein when the one or more programs are executed by the one or more processors, the one or more processors are caused to implement operations, the operations comprising:

obtaining a character to be displayed and a pre-selected target style type;

converting the character to be displayed into a target character corresponding to the target style type, wherein the target character is generated in at least one of modes: generating the target character in advance on the basis of a style type conversion model or generating the target character in real time on the basis of a style type conversion model, and wherein the style type conversion model comprises a first font feature extraction sub-model and a second font feature extraction sub-model;

displaying the target character on a target display interface; and wherein the operations further comprise conducting training to obtain the first font feature extraction sub-model and the second font feature extraction sub-model, wherein conducting the training comprises:

obtaining a first training sample set, wherein the first training sample set comprises a plurality of first training samples, and each first training sample comprises a theoretical character image and a theoretical character stroke corresponding to a first training character, and a mask character stroke that masks part of the theoretical character stroke, inputting, for the plurality of first training samples, a theoretical character image and a mask character stroke in a current first training sample into a to-be-trained font feature extraction sub-model to obtain an actual character image and a predicted character stroke corresponding to the current first training sample, conducting loss processing on the actual character image and the theoretical character image on the basis of a first preset loss function in the to-be-trained feature extraction sub-model, and conducting loss processing on the predicted character stroke and the theoretical character stroke on the basis of a second preset loss function to correct a model parameter in the to-be-trained font feature extraction sub-model according to a plurality of loss values obtained, setting convergence of the first preset loss function and the second preset loss function as a training target to obtain a to-be-used font feature extraction sub-model, and conducting eliminating processing on the to-be-used font feature extraction sub-model to obtain the first and second font feature extraction sub-models.

12. The electronic device of claim 11, wherein obtaining the character to be displayed and the pre-selected target style type comprises:

determining the target style type selected from a style type list in response to detecting that the character to be displayed is edited, wherein the style type list comprises a style type corresponding to the style type conversion model.

13. The electronic device of claim 11, wherein converting the character to be displayed into the target character corresponding to the target style type comprises:

obtaining a target character consistent with the character to be displayed from a target character package corresponding to the target style type, wherein the target character package is generated after converting a plurality of characters into a target font on the basis of the style type conversion model; or inputting the character to be displayed into the style type conversion model to obtain a target character corresponding to the target font.

14. The electronic device of claim 11, wherein the style type conversion model further comprises a first decoupling model connected to the first font feature extraction sub-model, a second decoupling model connected to the second font feature extraction sub-model, a feature splicing sub-model connected to the first decoupling model and the second decoupling model, and a feature processing sub-model;

wherein the first font feature extraction sub-model and the second font feature extraction sub-model have the same model structure, and are configured to determine character features of a plurality of characters respectively, and the character features comprise a style type feature and a character content feature; the first decoupling model is configured to decouple a character feature extracted by the first font feature extraction sub-model to distinguish the style type feature from the character content feature; the second decoupling model is configured to decouple a character feature extracted by the second font feature extraction sub-model to distinguish the style type feature from the character content feature; the feature splicing sub-model is configured to splice the character features extracted by the first decoupling model and the second decoupling model to obtain a corresponding character style feature; and the feature processing sub-model is configured to process the character style feature to obtain the target character of the character to be displayed in the target style type.

15. The electronic device of claim 14, wherein generating the target character in advance on the basis of a style type conversion model comprises:

determining a first to-be-decoupled character feature of the character to be displayed on the basis of the first font feature extraction sub-model, and determining a second to-be-decoupled character feature of the target style character on the basis of the second font feature extraction sub-model, wherein a character type of the target style character is consistent with the target style type;

processing the first to-be-decoupled character feature on the basis of the first decoupling model to obtain a to-be-displayed style type feature and a to-be-displayed content feature of the character to be displayed; and processing the second to-be-decoupled character feature on the basis of the second decoupling model to obtain the target style type and a target content feature of the target style character;

obtaining the to-be-displayed content feature and the target style type on the basis of the feature splicing sub-model to obtain a character style feature corresponding to the character to be displayed;

processing the character style feature on the basis of the feature processing sub-model to obtain the target character corresponding to the character to be displayed in the target style type.

16. The electronic device of claim 11, wherein the to-be-trained font feature extraction sub-model comprises a decoding module, and inputting a theoretical character image and a mask character stroke in a current first training sample into a to-be-trained font feature extraction sub-model to obtain an actual character image and a predicted character stroke corresponding to the current first training sample comprises:

extracting an image feature corresponding to the theoretical character image, and compressing the image feature to obtain a first to-be-used feature;

processing a feature vector corresponding to the mask character stroke to obtain a second to-be-used feature;

conducting feature interaction on the first to-be-used feature and the second to-be-used feature to obtain a character image feature corresponding to the first to-be-used feature and an actual stroke feature corresponding to the second to-be-used feature; and obtaining the predicted character stroke on the basis of the actual stroke feature, and decoding the character image feature on the basis of the decoding module to obtain the actual character image.

17. The electronic device of claim 16, wherein conducting eliminating processing on the to-be-used font feature extraction sub-model to obtain the font feature extraction sub-models comprises:

conducting eliminating processing on the decoding module in the to-be-used font feature extraction sub-model to obtain the font feature extraction sub-models in the style type conversion model.

18. A non-transitory computer-readable storage medium comprising a computer-executable instruction, wherein the computer-executable instruction, when being executed by a processor of a computer, is configured to execute operations, the operations comprising:

obtaining a character to be displayed and a pre-selected target style type;

converting the character to be displayed into a target character corresponding to the target style type, wherein the target character is generated in at least one of modes: generating the target character in advance on the basis of a style type conversion model or generating the target character in real time on the basis of a style type conversion model, and wherein the style type conversion model comprises a first font feature extraction sub-model and a second font feature extraction sub-model;

displaying the target character on a target display interface; and wherein the operations further comprise conducting training to obtain the first font feature extraction sub-model and the second font feature extraction sub-model, wherein conducting the training comprises:

obtaining a first training sample set, wherein the first training sample set comprises a plurality of first training samples, and each first training sample comprises a theoretical character image and a theoretical character stroke corresponding to a first training character, and a mask character stroke that masks part of the theoretical character stroke, inputting, for the plurality of first training samples, a theoretical character image and a mask character stroke in a current first training sample into a to-be-trained font feature extraction sub-model to obtain an actual character image and a predicted character stroke corresponding to the current first training sample, conducting loss processing on the actual character image and the theoretical character image on the basis of a first preset loss function in the to-be-trained feature extraction sub-model, and conducting loss processing on the predicted character stroke and the theoretical character stroke on the basis of a second preset loss function to correct a model parameter in the to-be-trained font feature extraction sub-model according to a plurality of loss values obtained, setting convergence of the first preset loss function and the second preset loss function as a training target to obtain a to-be-used font feature extraction sub-model, and conducting eliminating processing on the to-be-used font feature extraction sub-model to obtain the first and second font feature extraction sub-models.

19. The non-transitory computer-readable storage medium of claim 18, wherein obtaining the character to be displayed and the pre-selected target style type comprises:

determining the target style type selected from a style type list in response to detecting that the character to be displayed is edited, wherein the style type list comprises a style type corresponding to the style type conversion model.

20. The non-transitory computer-readable storage medium of claim 18, wherein converting the character to be displayed into the target character corresponding to the target style type comprises:

obtaining a target character consistent with the character to be displayed from a target character package corresponding to the target style type, wherein the target character package is generated after converting a plurality of characters into a target font on the basis of the style type conversion model; or inputting the character to be displayed into the style type conversion model to obtain a target character corresponding to the target font.

* * * * *